Sept. 9, 1969    J. T. MARKEY    3,465,571
APPARATUS FOR DETECTION OF TRANSVERSE CURVATURE
Filed Oct. 14, 1966
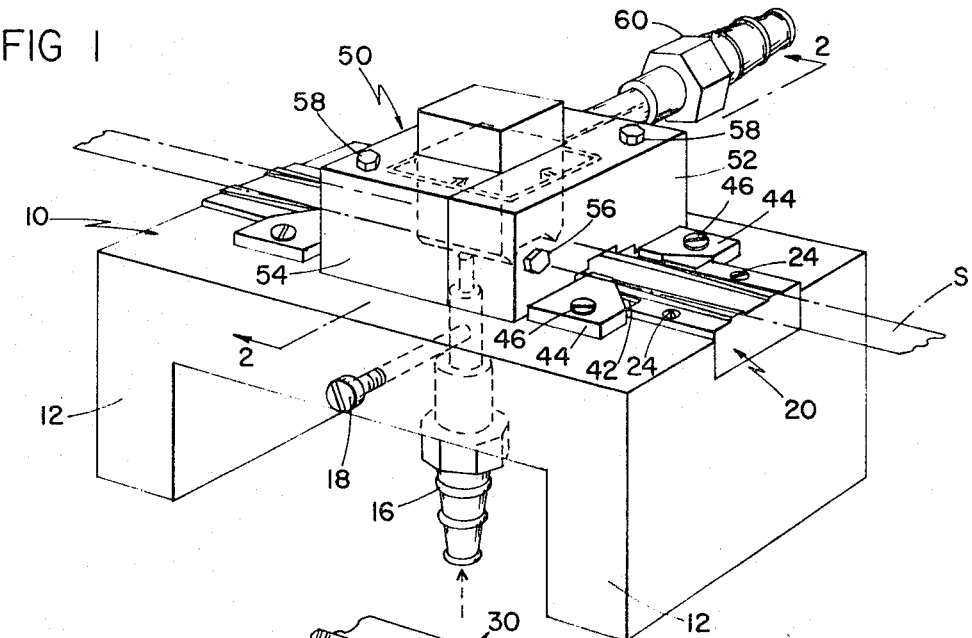
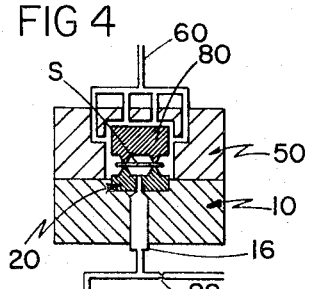
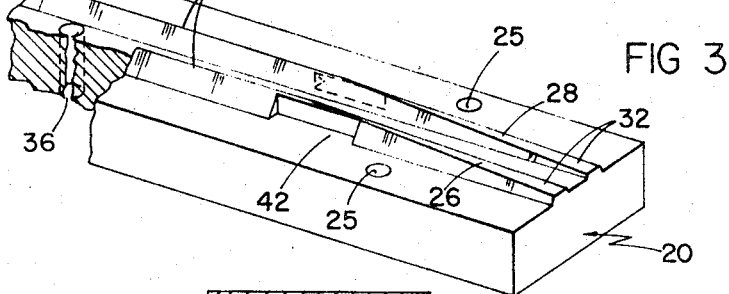
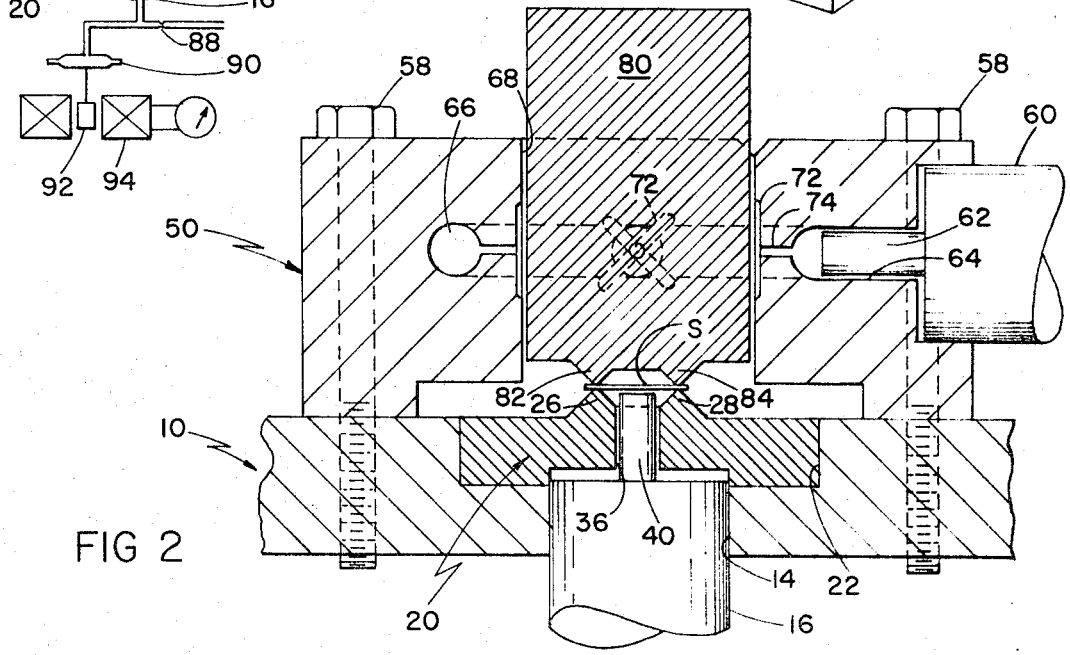

United States Patent Office 3,465,571
Patented Sept. 9, 1969

3,465,571
APPARATUS FOR DETECTION OF TRANSVERSE CURVATURE
Joseph Thomas Markey, Providence, R.I., assignor to The Gillette Company, Boston, Mass., a corporation of Delaware
Filed Oct. 14, 1966, Ser. No. 586,874
Int. Cl. G01b *13/04*
U.S. Cl. 73—37.7                    14 Claims

ABSTRACT OF THE DISCLOSURE

Apparatus for the detection of transverse curvature (dish) of razor blade stock (0.0015 inch in thickness and 0.193 inch in width) includes two carbide support rails each of which has a flat surface 0.005 inch in width on which the stock is supported. These rails are spaced 0.180 inch apart and define a reference plane. A hold down structure in the form of a 35 gram carbide block is disposed in an air bearing and has two corresponding rails formed on its lower surface. A nozzle whose outlet is positioned 0.004 inch below the reference plane provides an air gauge for sensing the distance of the center of the strip from the reference plane.

---

This invention relates to the detection of curvature in continuous strip material and more particularly to apparatus for detecting a transverse curvature out of its own plane (dish) of the strip material.

In the processing of strip metal, of the type intended for use in razor blades for example, a dish condition may occur. Such curvature in the metal strip creates a particular problem in the sharpening of an edge of the strip to a shaving edge, as the dish condition effectively offsets the edge of the metal strip to be sharpened relative to the supported body of the strip and to the sharpening equipment, so that the sharpening process is difficult to appropriately control and the likelihood of inferiorly sharpened blades increases.

It is an object of this invention to provide novel and improved apparatus for continually sensing strip material in a continuous processing operation for transverse curvature. In a particular application of the invention, sensing must be performed to an accuracy to detect transverse curvature of 0.0007 inch over a width of 0.180 inch of the strip metal out of its own plane and it is another object of this invention to provide gauging apparatus capable of accurately sensing such curvature values in a continuous process system.

Another object of the invention is to measure the transverse curvature of delicate strip material without introducing more than a negligible amount of distortion to the strip. Another object of the invention is to provide a gauging apparatus having an output independent of variations in strip thickness.

Still another object of the invention is to provide novel and improved sheet material sensing apparatus for sensing a condition of transverse curvature with precision while accurately guiding the strip material and imposing minimal impedance to the strip material.

In accordance with the invention there is provided a first pair of parallel spaced support elements that provide support for the edges of the strip to be sensed and which define a reference plane across which the strip material is moved in a continuous processing operation. A gauging assembly senses deviation of the center of the strip from the reference plane, resulting from the curvature of the strip out of its own plane, and the output of the gauging assembly may be utilized to control the processing of the strip material. The pair of support elements assure accurate positioning of the strip relative to the gauging assembly while producing minimal distortion of the actual transverse curvature condition of the strip. It is preferred that the support element width be less than 5% of the strip width and, in a preferred embodiment, each support rail is of inverted V configuration and has a width less than 3% of the width of the sensed strip. In a preferred embodiment, strip is maintained at the reference plane by a second set of rails formed in a hold down shoe which rests, under the influence of gravity, on the top of the strip. Each rail of the second set is radiused and accurately aligned with the corresponding support rail. To maintain precise guidance of the hold-down shoe with minimum friction, the shoe is supported in an air bearing which insures proper seating on the strip. Supplemental side guides are employed to position the strip in the desired lateral location. With the strip so positioned and restrained, a low pressure sensing jet is utilized in the gauging assembly to measure the degree of transverse curvature. This apparatus enables the accurate gauging of a dish condition in thin razor blade stock within precise gauging limits and is suitable for incorporation into a continuous processing line without adverse effect on the strip material or its processing.

Other objects, features and advantages will be seen as the following description of a particular embodiment of the invention progresses, in conjunction with the drawings, in which:

FIG. 1 is a perspective view of dish gauging apparatus constructed in accordance with the invention;

FIG. 2 is a sectional view, taken along the line 2—2 of FIG. 1, showing details of the gauging assembly;

FIG. 3 is a perspective view of the carbide support structure employed in the apparatus of FIG. 1; and FIG. 4 is a diagram of instrumentation used with the apparatus shown in FIG. 1.

With reference to FIGS. 1 and 2 there is provided a platform 10 having two depending legs 12 and a central vertical bore 14 for receiving an air jet assembly 16 which is held in place by set screw 18. A precision carbide reference plane structure 20 (shown in FIG. 3) is secured in transversely extending recess 22 in the upper surface of the platform 10 by means of machine screws 24 which pass through holes 25. Structure 20 includes two parallel spaced rail elements 26 and 28 which extend along its length and at their center are tapered to form relatively sharp apices each of which has a flat surface 30, 0.005 inch in width. Surfaces 30 are spaced 0.180 inch apart (centerline to centerline) and define a reference plane. The rails taper down away from the central portion of the rail structure as indicated in FIG. 3 and provide surfaces 32 of increasing width for supporting metal strip S. This allows for a slight incline of the strip at entry and exit of the gauging section thus providing more intimate contact with the reference rails and better isolation of the strip from vibrational effects. An aperture 36 located at the middle of the support structure 20 between the two rails is aligned wih bore 14 and receives nozzle 40 of air jet assembly 16.

The carbide support structure 20 has two pairs of recesses 42 which receive carbide guide plates 44 when the rail structure is positioned in the platform. The guide plates 44 are secured in position by machine screws 46 and define spaced vertical surfaces which project above the upper surfaces of the rails providing accurate edge guidance for the strip S on either side of the gauging station.

Secured to the platform above the gauging station is a bearing assembly 50 which includes two L-shaped members 52, 54 which are secured together and to the platform in precise position relative to the gauging station by machine screws 56, 58. An air distribution conduit 60 is connected to supply nozzle 62 which extends into bearing assembly 50 through port 64 for connection with circumferential conduit 66 formed in the two bearing members which completely surrounds the central opening 68 in the bearing assembly 50. In each vertical wall that defines opening 68 there is provided an X-shaped discharge orifice 72 which is connected with supply passage 74 via the circumferential distribution conduit 66.

A carbide hold down shoe 80, weighing thirty-five grams, fits inside central opening 68 in the bearing assembly 50 and is held spaced from the vertical walls thereof by air pressure issuing from the orifices 72. The lower surface of shoe 80 has two tapered rails 82, 84, each of which is one half inch in length and has a terminal surface formed to a radius of 0.005 inch and which is precisely aligned with the corresponding rail surface 30 to hold strip S therebetween.

A diagrammatic view of this gauging assembly with instrumentation coupled thereto is indicated in FIG. 4. Air is supplied at five pounds per square inch pressure through passage 60 to the four discharge orifices 72 in the central opening 68 of the bearing assembly 50. Air is supplied at a pressure of about ninety inches of water through restriction 88 to the gauging system and under nominal conditions air at a pressure of sixty inches of water issues from gauging jet assembly 16 with the outlet end of nozzle 40 positioned about 0.004 inch below the reference plane defined by rail surfaces 30. This low pressure is employed to minimize possible distortion of the strip due to the kinetic energy of the air jet impinging on the strip S. The back pressure at the air jet is sensed by a capsule 90 which moves the core 92 of a differential transformer 94 which transformer, as a function of the position of its core 92, produces an output indicative of the dish condition in the strip S.

Ribbon steel razor blade stock 0.0015 inch in thickness and 0.193 inch in width is measured with this gauging apparatus It will be noted that the surfaces 30 of rails 26 and 28 are located slightly inside the edges of the strip S so that imperfections in the edges of the strip S which might arise, for example, edge burr caused during the slitting of the steel into these relatively narrow strips do not displace the strip S from the reference plane.

While a particular embodiment of the invention has been shown and described, various modifications thereof will be apparent to those skilled in the art and therefore, it is not intended that the invention be limited to the disclosed embodiment or to details thereof and departures may be made therefrom within the spirit and scope of the invention.

What is claimed is:

1. Apparatus for sensing transverse curvature out of its own plane of moving continuous strip material comprising two strip support elements, said support elements being laterally spaced along a line perpendicular to the direction of movement of said strip material and the surfaces of said support elements defining a reference plane,
   structure for holding said strip material in engagement with said support elements, and a gauging assembly disposed between said support elements for sensing the deviation of the center of said strip material from said reference plane.

2. The apparatus as claimed in claim 1 wherein each said support element is a carbide member, the effective support surface width of which is less than 5% of spacing between said support elements.

3. The apparatus as claimed in claim 2 wherein each said support element has a width in the order of 0.005 inch.

4. Apparatus for sensing transverse curvature out of its own plane of moving continuous strip material comprising two spaced strip support elements, each support element being an elongated rail and said rails extending parallel to one another and being spaced apart slightly less than the width of the strip being sensed so that the surfaces of said support elements define a reference plane,
   structure for holding said strip material in engagement with said support elements, and a gauging assembly disposed between said support elements for sensing the deviation of the center of said strip material from said reference plane.

5. The apparatus as claimed in claim 4 wherein said support rails are manufactured of carbide and each has a central flat portion disposed in said reference plane and entrance and exit portions that incline downwardly away from said reference plane.

6. The apparatus as claimed in claim 4 wherein said holding structure defines two hold down rail members that extend parallel to each other and to the direction of movement of said strip material over said support rails and further including structure for positioning said hold down rails in precise alignment with the cooperating support rails.

7. The apparatus as claimed in claim 6 wherein each said hold down rail has a radiused surface for contact with said strip material.

8. Apparatus for sensing transverse curvature out of its own plane of moving continuous strip material comprising two spaced strip support elements, the surfaces of said support elements defining a reference plane,
   structure for holding said strip material in engagement with said support elements including a hold down shoe which rests on said strip material under the influence of gravity, and a gauging assembly disposed between said support elements for sensing the deviation of the center of said strip material from said reference plane.

9. The apparatus as claimed in claim 8 wherein said shoe is laterally positioned relative to said support elements by an air bearing assembly, said air bearing assembly supplementing the hold down influence of gravity.

10. The apparatus of claim 9 wherein said air bearing assembly comprises a member having an opening for receiving said shoe, said opening having slightly larger lateral dimensions than the lateral dimensions of said shoe, said member having air passages with orifices communicating with said opening, and an air supply to said passages for producing an air bearing between the sides of said shoe and the adjacent walls of said opening.

11. The apparatus of claim 10 wherein said orifices are X-shaped and are spaced around the walls of said opening.

12. Apparatus for sensing transverse curvature out of its own plane of moving continuous strip material comprising two spaced strip support elements, the surfaces of said support elements defining a reference plane,
   structure for holding said strip material in engagement with said support elements, a gauging assembly disposed between said support elements for sensing the deviation of the center of said strip material from said reference plane and adjustable side guide plates for laterally positioning said strip.

13. The apparatus as claimed in claim 1 wherein said gauging assembly includes an air jet nozzle fixedly located relative to said reference plane with its opening spaced from said reference plane for directing a flow of air against the center under-surface of said strip material, a regulated air supply connected to said nozzle, and apparatus for sensing back pressure at said nozzle.

14. The apparatus as claimed in claim 13 wherein said air supply supplies air through a restricter to said nozzle at a pressure of approximately sixty inches of water under nominal conditions.

References Cited

UNITED STATES PATENTS 2,728,223   12/1955   Herrman _____ 73—144

LOUIS R. PRINCE, Primary Examiner

WILLIAM A. HENRY II, Assistant Examiner